Feb. 5, 1952 J. G. BEARD ET AL 2,584,780

FREQUENCY CONTROL CIRCUIT

Filed Oct. 28, 1948 3 Sheets-Sheet 1

INVENTORS
JOSEPH G. BEARD
& NILS J. OMAN
BY
Harry Tunick
ATTORNEY

INVENTORS
JOSEPH G. BEARD
& NILS J. OMAN
BY Harry Tunick
ATTORNEY

Feb. 5, 1952 J. G. BEARD ET AL 2,584,780

FREQUENCY CONTROL CIRCUIT

Filed Oct. 28, 1948 3 Sheets-Sheet 3

INVENTORS
JOSEPH G. BEARD
& NILS J. OMAN
BY Harry Tunick
ATTORNEY

Patented Feb. 5, 1952

2,584,780

UNITED STATES PATENT OFFICE 2,584,780

FREQUENCY CONTROL CIRCUIT

Joseph G. Beard, Haddonfield, and Nils J. Oman, Merchantville, N. J., assignors to Radio Corporation of America, a corporation of Delaware Application October 28, 1948, Serial No. 56,974

16 Claims. (Cl. 332—19)

Figure 1:
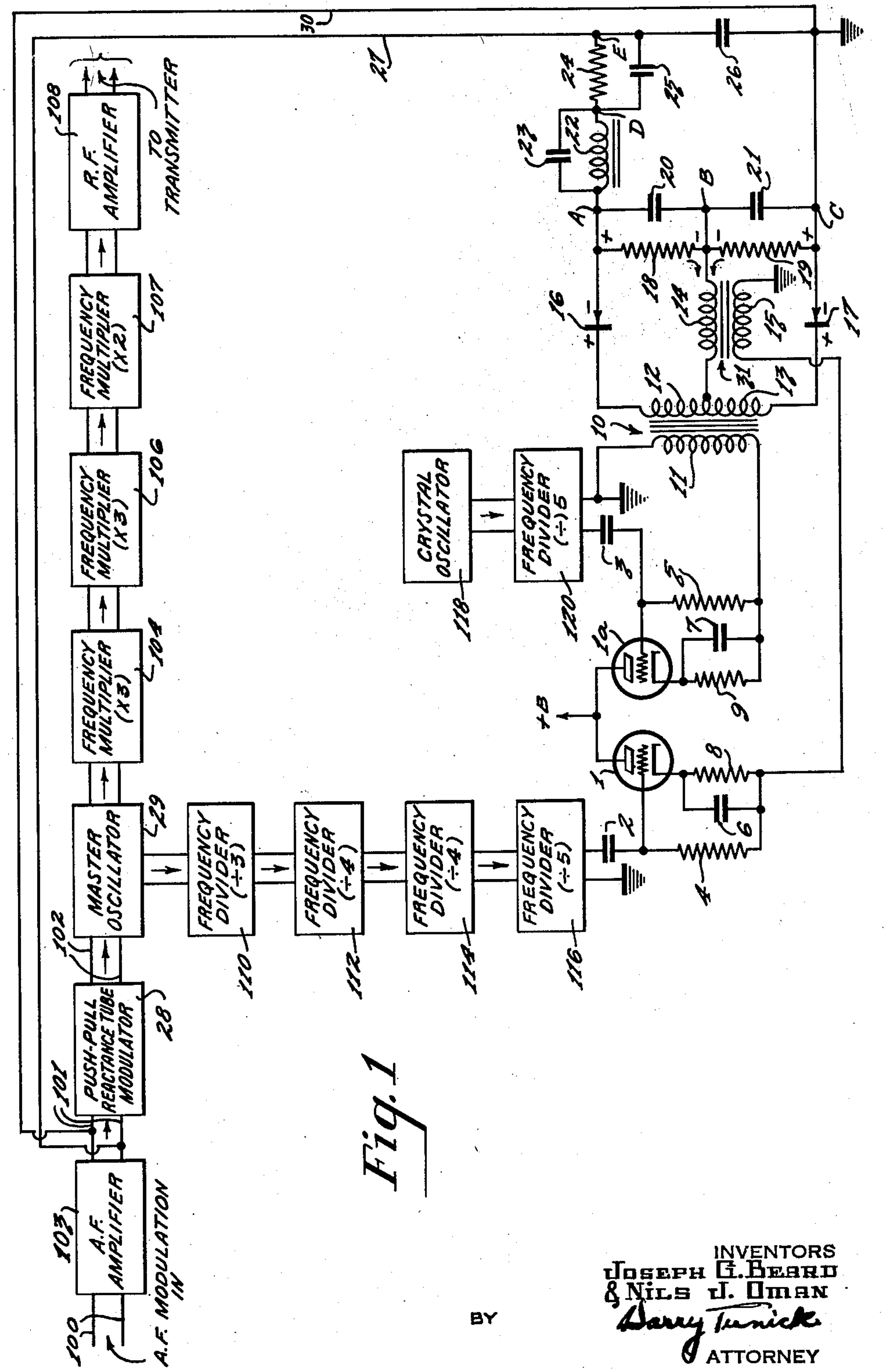

Our present invention relates to an improved frequency controlling system, especially useful for transmitters of the frequency modulation type.

At pages 118–130, inclusive, of the RCA Review for March, 1946, N. J. Oman has described "A new exciter unit for frequency modulated transmitters." As shown on pages 127 and 128 of this paper, the transmitter makes use of a pair of push-pull connected reactance tubes to vary the frequency of an oscillator in accordance with the modulation. A part of the output of the frequency-modulated oscillator is divided in frequency and compared with the divided frequency output of a stable crystal-controlled oscillator. The comparison is carried out in a balanced modulator or control tube system whose output in turn controls the direction of rotation of a motor. The shaft of the motor is attached to a tuning condenser which serves to control the mean frequency of operation of the master oscillator.

While the foregoing system is highly satisfactory in operation, it is relatively costly in regard to apparatus required and power necessary to drive the motor and control tubes. In accordance with our present invention, we provide an improved automatic frequency controlling system, especially useful for a frequency-modulated transmitter, which is highly simplified, avoids the use of a motor controlled condenser, and is equal, if not superior, in performance.

One object of our invention is to provide a wholly electronic frequency controlling system operable over a wide range. In this connection, it should be noted that it has been proposed to make use of so-called phase detectors for controlling the frequency of an oscillator. In one type of phase detector, a part of the oscillator output is fed cophasally to a pair of detectors, and waves derived from a constant frequency source are fed anti-phasally to the detectors. In the immediate vicinity of zero beat between the two frequencies, a highly filtered direct current component appearing in the output of the detectors is fed back to the oscillator to remedy departures in frequency.

Such a phase detection system for controlling automatically the mean frequency of a frequency-modulated oscillator is not particularly satisfactory, since the range of operation is limited to about ±90°. In terms of frequency, this represents something less than 17 cycles per second difference in frequency between the frequencies compared in the phase detector. If the difference in frequencies compared is greater than an equivalent phase difference of 90°, or approximately 17 cycles, then the system tends to fail completely, giving no frequency controlling action. In accordance with our present invention, we provide an improved electronic automatic frequency controlling system which "locks in" or takes control despite departures as great as a hundred cycles or more per second between the waves which are compared to produce the frequency controlling voltages, and which provides a highly stable output from the controlled oscillator.

The preferred form of our invention is similar in a general way to the system described by N. J. Oman in the March, 1946, RCA Review, above referred to. The frequency-divided output of the frequency-modulated oscillator is fed to a pair of detectors, as is also a wave of constant frequency such as the frequency-divided output of a stabilized crystal-controlled oscillator. Our invention is particularly characterized by the fact that part of the resulting beat frequency difference is fed back as an undulating wave of beat frequency to the reactance tube system of the transmitter. We have found, as will be explained more fully hereinafter, that the result of feeding back an appreciable amount of the alternating current component of the beat frequency, as compared to only the highly filtered direct current component as proposed heretofore, is to provide frequency control and stabilization over a wide frequency range. This control takes hold slowly at first for a large frequency deviation, but rapidly increases in speed of correction until substantially exact synchronism is attained.

Figures 9, 10:
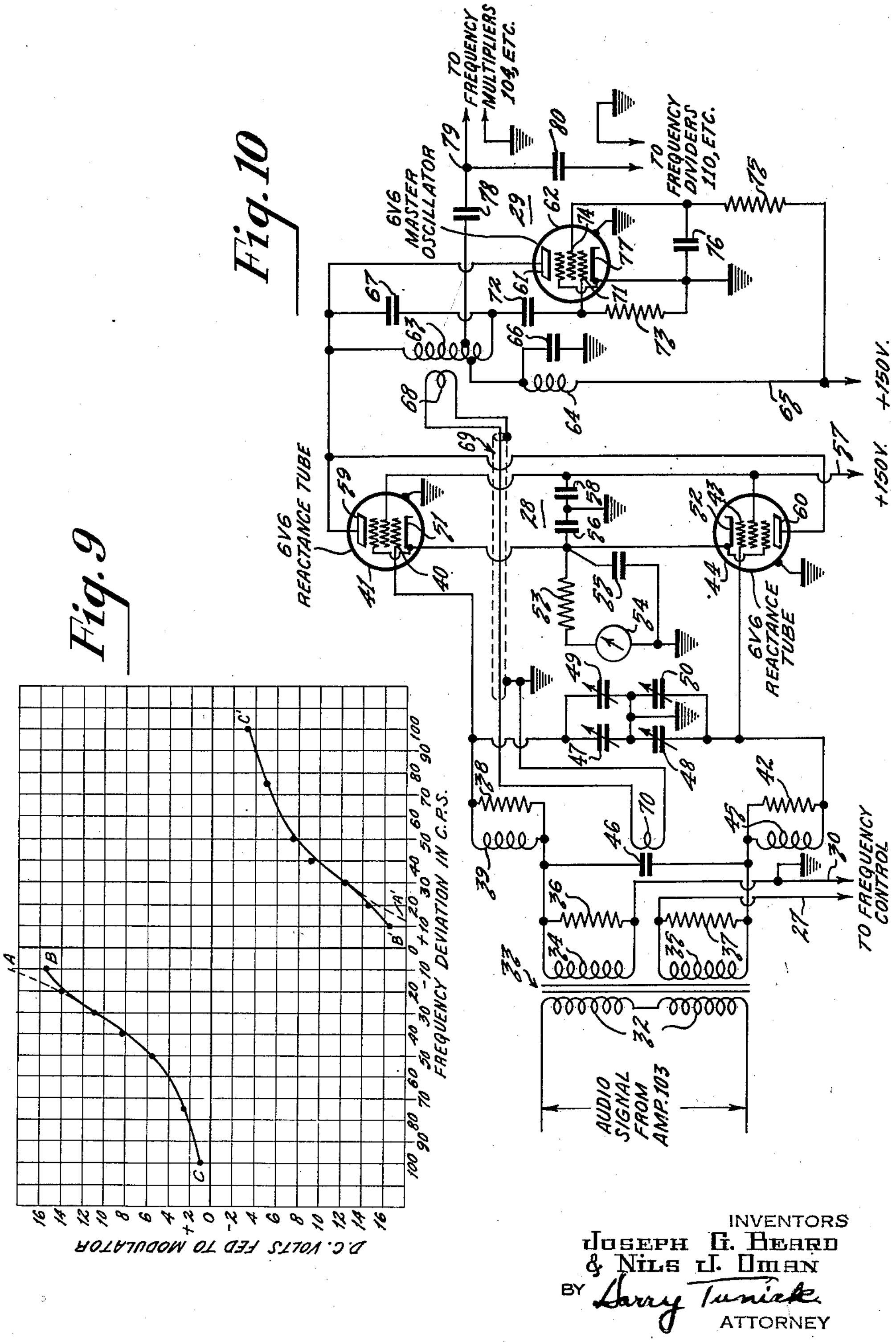

Other features, objects and advantages will appear as our invention is described hereinafter in greater detail, with the aid of the accompanying drawings, wherein:

Fig. 1 is a schematic wiring diagram of our improved automatic frequency controlling system;

Figs. 2 to 9, inclusive, are curves explanatory of the operation of the frequency controlling system of Fig. 1; and Fig. 10 is a more detailed wiring diagram of the frequency-modulated oscillator and reactance tube circuits of Fig. 1.

As shown in Fig. 1, the modulation (which may be in the form of an audio frequency program to be broadcast) is fed by means of the lines 100 and 101 through the audio frequency amplifier 103 to the balanced or push-pull reactance tube modulator 28. The latter is connected through connections 102 to the master oscillator 29 which may operate, for example, at 6 megacycles, and varies the frequency thereof as described in the paper by N. J. Oman previously referred to. The output of the frequency modulated oscillator 29 is fed through the cascaded frequency multipliers 104, 106 and 107, each having a multiplying factor as indicated in the corresponding block, and then to the buffer amplifier 108. The output of amplifier 108 may be directly radiated or fed to additional frequency multipliers and power amplifiers before being fed to an antenna for radiation.

In order to maintain the transmitter on its assigned mean frequency, a part of the wave output of master oscillator 29 is fed to the series of frequency dividers 110, 112, 114 and 116. These dividers have the frequency dividing factors indicated and are preferably of the type described in the above-mentioned article by N. J. Oman. There is also used for frequency stabilizing or automatic frequency controlling purposes, the crystal controlled oscillator 118 which may operate at, for example, 125,000 cycles. The output of crystal oscillator 118 is divided in frequency by divider 120 having a frequency dividing factor of five, for example.

The outputs of the frequency dividers 116 and 120 are fed into the apparatus 1–26, inclusive. The latter, as will be described more fully shortly, produces an undulating or alternating current beat frequency component and also a direct current component. These components are fed through connections or lines 27 and 30 to the input or controlling side of the reactance tube circuit 28 for automatic frequency controlling purposes. Because the beat frequency component is fed back in the system described herein, by way of connections 27 and 30, we have found that the pull-in range is substantial and causes the master oscillator 29 to be brought back to its assigned frequency, even though for some reason or other it has departed therefrom by such an amount as to cause the difference in frequency between the electrical wave outputs of dividers 116 and 120 to be of the order of hundreds of cycles.

More fully in connection with apparatus 1 to 26 of Fig. 1, the output of frequency divider 116 is fed through condenser 2 and ground to the control grid and cathode of tube 1, and similarly, the output of divider 120 is fed through condenser 3 and ground to the control grid and cathode of tube 1*a*. The voltages fed to the grids of tubes 1 and 1*a* may, for example, have a frequency of 25,000 cycles. The grid circuits of the tubes 1 and 1*a* are completed by resistors 4 and 5. The cathode return circuit for tube 1*a* includes the primary transformer coil 11 of transformer 10 and the resistance-condenser circuit 9, 7. Similarly, the cathode return circuit for tube 1 includes the primary transformer coil 15 of transformer 31 and the resistance-condenser circuit 8, 6.

It will be observed that, in this way, the frequency dividers 116 and 120 are effectively isolated from each other, the output of divider 120 being fed anti-phasally or in push-pull through primary transformer coil 11 and the two secondary coils 12 and 13 to the detectors 16 and 17. The latter may be diodes or crystal detectors or rectifiers, such as detectors of the germanium type, known as type 1N38, and should be matched very closely to each other.

The output of divider 116 is fed through primary transformer coils 15 and secondary coil 14 cophasally or in push-push to the detectors 16, 17. The output circuit of the detectors 16, 17 is made up partly of the resistance-condenser networks 18, 20, and 19, 21. In addition, the output circuit includes the filtering network 23, 22 and the capacity dividing system 25, 26, the former capacity being shunted by the resistor 24. The capacity divider serves to feed a part of the beat frequency difference through connections 27 and 30 to the reactance tube system 28. The lower plate of condenser 26 is grounded, as shown. For reasons that will appear hereinafter, the circuit 12—26 may be termed a "distorted-beat-frequency control" circuit.

Although it is to be understood that this invention is not to be limited in any sense thereby, the following values are given for certain of the circuit constants in Fig. 1, as illustrative of values which have been used in a practical embodiment of the same:

| | |
|---|---|
| Isolating tubes 1 and 1*a* | Twin triode 6SN7 |
| Condenser 2 | .25 mfd. |
| Condenser 3 | .25 mfd. |
| Resistor 4 | 560,000 ohms |
| Resistor 5 | 560,000 ohms |
| Condenser 6 | 1 mfd. |
| Condenser 7 | 1 mfd. |
| Resistor 8 | 1000 ohms |
| Resistor 9 | 1000 ohms |
| Rectifier 16 | Crystal type 1N38 |
| Rectifier 17 | Crystal type 1N38 |
| Resistor 18 | 6800 ohms |
| Resistor 19 | 6800 ohms |
| Condenser 20 | 3900 mmf. |
| Condenser 21 | 3900 mmf. |
| Inductance 22 | 330 mh. |
| Condenser 23 | 200 mmf. |
| Resistor 24 | 1 megohm |
| Condenser 25 | .1 mfd. |
| Condenser 26 | 2 mfd. |

A more detailed description of the operation of the system is as follows:

If a wave of given frequency is introduced on the primary 11 of transformer 10, equal voltages will be developed across the two halves 12 and 13 of the secondary of transformer 10. Rectification will take place because of the action of detectors 16 and 17. Voltages of equal magnitude and of the polarity indicated will be set up on resistors 18 and 19, between points A and B, and B and C, respectively. There will be no net voltage from A to ground or point C. In a like manner, a wave of given frequency may be introduced at 15 with similar results.

If a wave of frequency $f1$ is introduced at 11 and another frequency $f2$ differing by an amount $\Delta f$ is introduced at 15, a difference frequency or beat frequency will appear at A and the potential of A will alternate above and below ground potential. The capacitors 20 and 21 filter out the wave of frequency $(f1+f2)$ and to a lesser degree $f1$ and/or $f2$. The filtering out of $f1$ and $f2$ is improved by the parallel tuned circuit 22 and 23 which is broadly resonant to both $f1$ and $f2$. At point D, therefore, we have (for a first approximation) an electrical wave having a frequency which is substantially only the difference between $f1$ and $f2$ or $\Delta f$.

The capacity divider 25 and 26 transmits a portion of this beat frequency wave to the reactance tube modulator circuit 28 through connections 30 and 27 and also 101. This voltage causes the frequency of the master oscillator 29 to swing ±4000 cycles, approximately, with the circuit constants previously given.

Assume that the master oscillator 29 is off its proper mean or rest frequency by 24,000 cycles. The output of multiplier 107 will then be off frequency by 24,000×18, or 432,000 cycles. The frequency appearing at winding 15 will fail to agree with the reference frequency at winding 11 by 24,000 divided by 240 or 100 cycles. The normal mean frequency of oscillator 29, for this illustration, may be 6,000 kilocycles or 6 megacycles, the frequency of reference oscillator 118 may be 125 kilocycles, and the normal comparison frequency in windings 11 and 15 may be 25 kilocycles. If capacitor 25 is omitted from the circuit, there will exist across points A and C a sine wave beat frequency voltage of 100 cycles, plus the beating frequencies themselves.

Under the above conditions, between points D and C (or ground) there will be only the beat frequency voltage of 100 cycles, the beating frequencies being filtered out by the tuned circuit 22, 23 which is broadly resonant to both of these beating frequencies, which in the example given are 25,000 cycles and 25,100 cycles. This result is obtained under the assumptions that the voltage from the crystal divider 120 is large or small compared to that from the master oscillator divider 116, and that one or the other is distortion free, a necessary condition if the beat note is to have low harmonic content, since it is produced by the addition of only two voltage vectors. When condenser 25 is omitted, practically none of this beat frequency voltage appears between point E and ground.

As previously described, in the so-called phase detector type of circuit, it has been proposed to use a pair of detectors or rectifiers connected in a fashion somewhat similar to that disclosed herein. The rectifiers 16 and 17 herein, and the rectifiers in the so-called phase detector circuit, perform essentially the same function, in that in both circuits they act as mixers to obtain the beat frequency between the divided crystal oscillator frequency and the divided frequency from the master or modulated oscillator. The circuit disclosed herein is quite similar to the prior so-called phase detector circuit, except for the addition of condenser 25 in the present circuit. This change or addition alters the performance of the circuit in a very desirable manner, as will become apparent, increasing the pull-in range by a factor of five or more. As will be explained subsequently, the basis of operation for this extended range is not a phase detector action, but is one entirely different therefrom, being a distorted-beat-frequency control action. The so-called phase detector circuit will function only if the frequency modulation of the master oscillator by the beat note is great enough to bring about synchronization of the master oscillator on the first cycle of beat frequency, and this situation can exist only when the beat note is of very low frequency. In contrast, as will be described more fully hereinafter, the present circuit is capable of building up a direct current correcting voltage to bring the average master oscillator frequency to the correct value, even though at the outset such average frequency may be far beyond the range within which any phase detector action can effectively occur.

Now assume that the capacitor 25 is added as shown, and the beat note voltage adjusted so that the beat frequency voltage appearing from point E to ground (or across condenser 26) is such as to cause the reactance tubes 28 to modulate the frequency of master oscillator 29 by ±4166 cycles, which corresponds to the normal frequency swing required for 100% modulation. The values of capacitors 25 and 26 are chosen to form a capacitive voltage-divider which will allow the beat frequency voltage to swing or modulate said master oscillator a sufficient amount to produce this 100% modulation. The actual swing produced is not critical and this figure is chosen to illustrate an operable condition.

This swing in frequency of the master oscillator 29 is also apparent, at the comparison frequency of 25 kilocycles, as frequency modulation of the beat note. This is so because, with condenser 25 in the circuit, a portion of the beat note or beat frequency voltage developed at or appearing at D is passed on to point E and is applied by leads 27 and 30 to the modulator 28, and because one of the frequencies producting the beat comes from the master oscillator 29 through the winding 15. In other words, with condenser 25 omitted, there is no appreciable modulation of oscillator 29 at beat frequency via leads 27 and 30, and the beat note itself is fixed at 100 cycles and is a sine wave; on the other hand, with lead 27 connected through condenser 25, the beat note is no longer a sine wave but slows to a minimum of 100 cycles minus 17.36 cycles (4166÷240) when the beat note frequency excursion is toward the correct frequency and speeds up to a maximum of 100+17.36 cycles when the beat frequency voltage is causing the master oscillator 29 to swing away from the correct frequency. This effect does not in itself alter the beat period at the comparison frequency, but introduces even harmonic distortion, causing the wave form of the difference or beat frequency to be non-sinusoidal.

The voltage of the beat note lingers longer on the half-cycle in which it swings the master oscillator frequency toward the correct frequency. Figs. 2 to 8, inclusive, show (for various frequency differences between the voltages in windings 11 and 15) the actual wave forms of the beat frequency voltages between points D and C or ground (Fig. 1) under two different conditions. These wave forms were taken when the divided master oscillator frequency was set at the various beat frequencies indicated in each figure above the divided frequency of the reference crystal oscillator. Wave forms for the situation when the divided master oscillator frequency is set below the divided frequency of the reference crystal oscillator are of the same shade, except that they are inverted with respect to the wave forms illustrated.

In order to obtain the wave forms of Fig. 2 to 8, inclusive, a series capacitor (not shown) of 0.1 microfarad was inserted in lead 27, while a resistor (not shown) of 150,000 ohms was connected between the reactance tube side of said condenser and ground. In this way, direct voltage from point E to ground was isolated from the reactance tube, while the grids of the reactance tubes were returned to ground for direct voltage. The solid line curve in each of Figs. 2 to 8, inclusive, shows the wave form of the beat frequency voltage while the master oscillator is being frequency-modulated by the various beat frequencies, while the dashed line curve in each figure shows the wave form from point D to ground with point E short-circuited to ground. In other words, the dashed line curves represent the condition in which the master oscillator 29 is not being frequency-modulated by the beat frequency, where condenser 25 is, in effect, omitted from the circuit, and these dashed line curves are, therefore, substantially sinusoidal.

By a comparison of the solid line curve with the dashed line curve in each of Figs. 2 to 8, inclusive, the non-sinusoidal shape or even-harmonic-distortion of the beat frequency voltage, when condenser 25 is in the circuit, and when the master oscillator is being frequency-modulated by the beat frequency, may be seen. In each instance, the voltage of the beat note or beat frequency lingers longer on the negative half-cycle than on the positive half-cycle, since it is during this negative half-cycle that the frequency of the master oscillator is being swung toward the correct frequency, when the master oscillator frequency is above the correct frequency. When Figs. 2 to 8, inclusive, are examined, it should be seen why the circuit 12—26 is termed a "distorted beat-frequency control" circuit, the distortion of the beat frequency being evident in these figures.

Figures 2, 3, 4, 5, 6, 7, 8:
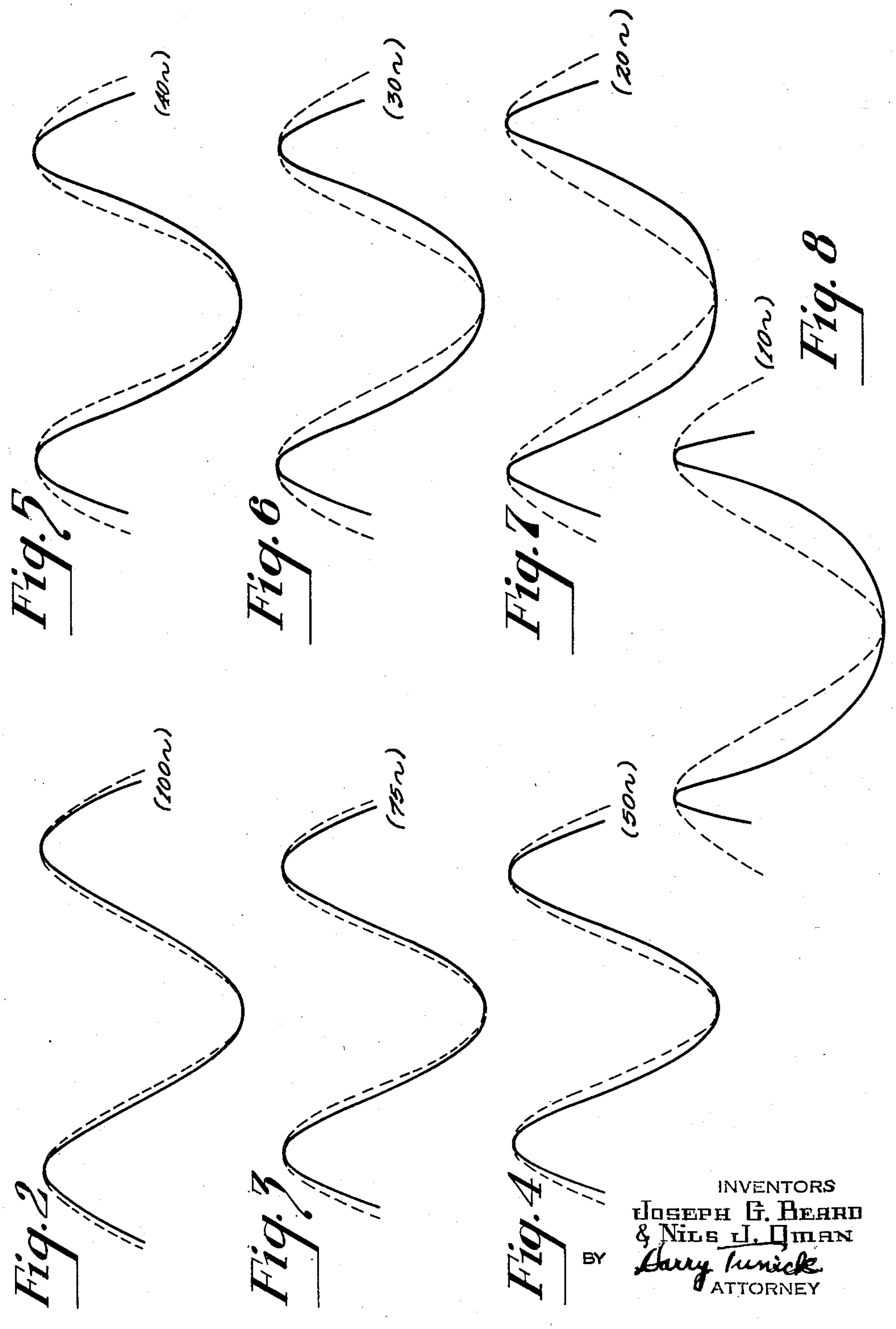

From a comparison of the solid line wave in Fig. 2 with that of each of Figs. 3 to 8, inclusive, it may be seen that the distortion of the beat note voltage increases as the average frequency of the master oscillator 29 approaches the correct or reference frequency. This is because, as the beat frequency becomes less and less, the frequency excursion or deviation of the beat note (which deviation is 17.36 cycles in the example given) becomes a larger and larger percentage of the average beat frequency itself. Due to the fact that whenever there is a difference frequency between the frequency-divided output of the master oscillator 29 and the divided output of the crystal oscillator 118, the master oscillator frequency is frequency-modulated by that difference frequency, the wave form of the beat frequency voltage is irregular or unsymmetrical in shape about a zero axis, as shown in Figs. 2 to 8, one side of the wave being sharp and narrow and the other being wide and rounded. The time constant of the RC integrating circuit 24, 26 is long compared to 100 cycles, so that this unsymmetrical wave shape is integrated thereby, causing a direct voltage to appear across condenser 26 of a polarity such as to cause the average frequency of the master oscillator 29 to shift toward the desired or correct frequency. This direct voltage is applied through leads 27 and 30 to the reactance tube circuit 28 to correct the frequency of the master oscillator 29. The effect is cumulative because, as the average frequency of the master oscillator approaches the reference frequency, the distortion of the beat note voltage increases, causing the correction or integrated voltage (appearing as a charge on condenser 26) to increase.

To further emphasize the effect of this unsymmetrical or distorted beat frequency in producing a direct voltage for controlling the frequency of oscillator 29, the value of direct voltage fed up lead 27 (as measured between point E and ground) is tabulated below for several frequencies. In order to make these measurements, the same series capacitance and shunt resistance (not shown) in lead 27 as described above, in connection with the wave forms of Figs. 2 to 8, were used, the shunt resistance being connected from the reactance tube grid to ground to provide a direct current potential at the reactance tube corresponding to no frequency modulation of the master oscillator.

| Frequency cycles per second above the reference | Negative D. C. volts with freq. mod. of MO | Negative D. C. volts without freq. mod. of MO |
|---|---|---|
| 100 | 3.2 | 1.6 |
| 75 | 4.55 | 1.7 |
| 50 | 7.55 | 1.55 |
| 40 | 9.0 | 1.4 |
| 30 | 12.0 | 1.2 |
| 20 | 14.0 | 1.0 |
| 10 | 16.3 | .8 |

By comparing corresponding rows in the second and third columns of the above table, it may be seen that the frequency modulation of the master oscillator by the beat frequency (whereby a distorted beat frequency voltage is produced) produces a substantial direct current voltage. If all the circuit requirements such as symmetry and shielding from stray pick-up and freedom from unintentional distortion, etc., were met perfectly, the figures of column 3 should all read zero volts. The important point to note is that, by providing the series capacitance 25 in the feed back or control lead 27, a portion of the beat note developed at the output of the distorted-beat-frequency control circuit is passed to the reactance tube circuit 28, causing frequency modulation of the oscillator 29 by the beat frequency and thereby also distortion of the beat note, which in turn builds up a direct voltage across condenser 26 of such a polarity as to cause the average frequency of the master oscillator 29 to shift toward the reference frequency. In other words, the oscillator 29 is caused to change frequency by the beat frequency itself (which is thereby distorted and which therefore produces a direct voltage for control purposes).

In accordance with this invention, the amplitude of the beat frequency wave form itself, whether plus or minus excursion is considered, has been found to be constant regardless of the frequency value or frequency modulation thereof, as illustrated in Figs. 2 to 8, inclusive, whereas the direct control voltage produced is dependent on the frequency value of the beat frequency, becoming greater as the frequency value decreases, as may be seen also by reading down the second column of the above table. Reading down the third column of the table above, it may be seen that when condenser 25 is not provided and when there is, therefore, no frequency modulation of the master oscillator by the beat frequency, only a very small and substantially constant value of direct control voltage is produced at lead 27 throughout the range of beat frequencies given in the table.

The data given in the first two columns of the above table has been plotted in Fig. 9 on the right-hand or positive frequency deviation side of the central, vertical zero axis. Additional data was taken when the frequency of the master oscillator was below the reference or desired frequency, in order to plot the curves on the left-hand side of the central, vertical zero axis.

The data for Fig. 9 was determined in the following way: The direct voltage from point E to ground was isolated from reaching the reactance tubes by inserting a capacitor of 0.1 microfarad (not shown) in lead 27. A resistor of 150,000 ohms was connected from the reactance-tube side of said condenser to ground to return the grid of the reactance tube to ground for direct voltages. The data for the Fig. 9 curve was then taken by measuring the direct voltage across point E to ground as the master oscillator 29 was adjusted to different beat frequencies. The solid line curve C, B, B′, C′ in Fig. 9 is the actual measured direct voltage available for frequency correction, when the frequency deviation of the master oscillator was varied between minus 100 and plus 100 cycles per second, at the comparison frequency of 25 kilocycles, while the dashed line curve C, A, A′, C′ indicates the probable operating values of such direct voltage. The measured values near zero beat frequency are lower than the actual or operating values because the series capacitor in lead 27 added to allow these measurements to be made under static conditions will not pass the low frequencies; if the value of this capacitor were increased the data could not be taken as close to zero beat, because the circuit would then have sufficient control to take the frequency to zero deviation.

Capacitors 25 and 26 have values such, as stated above, to allow the beat frequency to swing or frequency modulate the master oscillator 29 a sufficient amount to produce 100% modulation (for example, +75 kilocycles at 108 megacycles). One hundred percent modulation is mentioned since this amount allows a reasonable advantage to be taken of the capability of the reactance tubes to correct the frequency. To use a value which would give less than 100% modulation would result in reduced range and sensitivity and in more time being required for the system to correct the frequency of the master oscillator.

The above-described process, which produces and applies to reactance tube circuit 28 a rather large and steadily-increasing direct voltage as the average frequency of the oscillator 29 approaches the desired or reference frequency of 25 kilocycles at the output of divider 116 (this direct voltage being of such polarity as to cause the average frequency of oscillator 29 to shift toward the reference frequency) continues until the beat note is reduced to 17.36 cycles, in the example given, at which time its frequency modulation of the master oscillator is sufficient to cause said oscillator to come into step with the reference frequency, or to cause the divided master oscillator frequency to become exactly equal to the divided crystal oscillator frequency. When the master oscillator reaches the desired frequency, or the point of zero beat, condenser 26 in effect drops out of the picture, since it will not pass direct current, and the full direct voltage developed between point D and ground is available through resistor 24 at the reactance tubes to maintain the zero beat condition. Once the frequency difference between the divided master oscillator and crystal oscillator frequencies has been reduced to close agreement within ±90°, the action is to hold the frequency constant with the direct current output of the circuit 11—24 being applied to the reactance tubes as the master oscillator frequency drifts one way or the other.

Resistor 24 and capacitor 25 together have a time constant of 0.1 second, which increases the sensitivity of the system as the beat frequency is decreased toward zero. With the long time constant (two seconds) of the RC circuit 24, 26, and with the large control range available at zero beat, the circuit is unstable if condenser 25 is not included therein. With condenser 25 present, however, there is provided a prompt correction voltage in response to even a sudden and rather large deviation of the master oscillator frequency, which correction voltage is maintained long enough to allow more permanent correction to take place, as above described, by the long time constant circuit.

It should be noted that the ordinary phase detectors, making use as they do of only the filtered, direct current output of the same, provide frequency controlling action only if the difference in frequency between the waves fed to the detector is of the order of 10 to 17 cycles, or less. The direct current output must also be of sufficient amplitude to swing the modulated oscillator almost to zero beat. In the system which has been described herein, the beat frequency is allowed to reach the reactance tubes, as a result of which a much greater range of control is provided. We have found that the ratio of capacitances of the condensers 25 and 26 has a decided influence on the pull-in range of the system. As an example, we have obtained pull-in from departures or deviations as great as ±432,000 cycles at a multiplied master oscillator frequency of 108 megacycles, or ±100 cycles at the comparison frequency of 25 kilocycles. Such large deviations may be expected at various times, for example, when the master oscillator is first turned on.

To summarize the invention, the beat frequency voltage fed to the reactance tube system causes a direct voltage of correct polarity to be also fed thereto, to drive the modulated oscillator toward zero beat. This, we have found, causes the direct frequency control voltage again to increase in such a way that while progress is relatively slow at the outset for a large departure from the correct frequency, it increases in speed as zero is approached. For example, as the beat frequency is reduced to approximately 20 cycles, completion of the synchronizing action takes place quite rapidly.

From an inspection of the circuit of Fig. 1, it may be seen that program modulation will be fed back by the frequency control circuit described. However, with the circuit constants used, this effect is too small to seriously alter the response of the exciter system described in the useful frequency range.

Fig. 10 is a detailed wiring diagram of the frequency modulated oscillator and reactance tube circuits 28 and 29. These circuits are substantially similar to that shown on page 128 of the March, 1946, RCA Review, previously referred to. The audio signal from audio amplifier 103 is applied equally to the two halves of a primary winding 32 of input transformer 33 which has two secondary windings 34 and 35, winding 34 having in parallel therewith a resistor 36, and winding 35 having a resistor 37 in shunt therewith. One end of winding 34 is connected through a resistor 38 to the control grid 40 of a first pentode reactance tube 41, resistor 38 having connected in parallel therewith an inductance 39. The opposite end of winding 34 is grounded as shown, and is connected to lead 30 of the frequency control circuit of Fig. 1.

One end of winding 35 is connected through a resistor 42 to the control grid 43 of a second pentode reactance tube 44, resistor 42 having connected in shunt therewith an inductance 45. The opposite end of winding 35 is connected to lead 27 of the frequency control circuit of Fig. 1. A suitable radio frequency by-pass capacitance 46 is connected across the grid ends of windings 34 and 35. In the above manner, the audio frequency program signal and the frequency control signal from the distorted-beat frequency control circuit previously described are both suitably applied to the two push-pull reactance tubes 41 and 44.

To complete the input circuit to the reactance tubes, the control grids 40 and 43 are connected to each other through a pair of series variable condensers 47 and 48, the common point of condensers 47 and 48 being grounded as shown. A second pair of series variable condensers 49 and 50 is connected in parallel with condensers 47 and 48, the common point of condensers 49 and 50 also being connected to ground. The cathode 51 of tube 41 and the cathode 52 of tube 44 are directly connected to each other and are connected to ground through a common biasing resistor 53 and a suitable meter 54, a by-pass condenser 55 being connected between the two cathodes and ground, as is also another by-pass condenser 56.

The screen grids of the tubes 41 and 44 are supplied with a suitable positive potential by means of lead 57, a by-pass condenser 58 being connected between this lead and ground. The suppressor grids of reactance tubes 41 and 44 are connected to their corresponding cathodes. Anode 59 of tube 41 and anode 60 of tube 44 are connected together and are tied directly to the anode 61 of oscillator tube 62, which, like tubes 41 and 44, may be a type 6V6 pentode. Positive anode potential is supplied to anodes 59, 60 and 61 through a tank coil 63 and a choke 64 from a lead 65 which is connected to a source of positive potential. Choke 64 is by-passed to ground by a suitable condenser 66, while coil 63 is tuned by a suitable condenser 67. The grids 40 and 43 are suitably driven from the anode tank coil 63 by means of a coil 68 which is inductively coupled to coil 63 and which is connected through a concentric line 69 to a coil 70 which is inductively coupled to inductances 39 and 45. In this way, tubes 41 and 44 provide the push-pull reactance tube modulator circuit 28. In order to provide the necessary feed back for master oscillator 29 or tube 62, the control grid 71 of said tube is coupled through a condenser 72 to the end tank coil 63 opposite to that to which anode 61 is connected. A leak resistor 73 is connected between grid 71 and ground. Positive potential is applied to the screen grid 74 of tube 62 by connecting said grid through a dropping resistor 75 to positive potential lead 65, a by-pass condenser 76 being connected between said screen grid and ground. The suppressor grid of tube 62 is connected to the grounded cathode 77 of said tube.

By means of the above-described connections, master oscillator 29 produces oscillations of a frequency determined mainly by elements 63 and 67, and which may be varied within limits by the voltage applied to the grids of the reactance tube circuit 28. The oscillatory output of oscillator 29 is taken off by an intermediate tap on tank coil 63 and fed through a condenser 78 to a terminal 79, from whence it goes to frequency multipliers 104, 106, etc., for transmission, and also through a condenser 80 to the frequency dividers 110, 112, etc., for the frequency control circuit previously described in connection with Fig. 1.

This completes the description of our invention. It will be noted that we have provided a wholly electronic automatic frequency-controlling system which is operable over a very wide range and which has an adequate performance.

What is claimed is:

1. In a frequency modulation system, a frequency-modulated oscillator the rest frequency of which is to be stabilized, means for modulating the frequency of said oscillator, a stable reference oscillator, connections including isolating means for applying the outputs of said oscillators to a common mixing circuit, said isolating means serving to prevent direct cross-feed or locking action between said two oscillators, said mixing circuit producing from said applied outputs an oscillatory resultant voltage having a frequency equal to the difference between the frequencies of said applied outputs, and means for applying said resultant voltage to said first-named means to vary in accordance therewith the rest frequency of said first-named oscillator.

2. The method of controlling the rest frequency of a frequency-modulated oscillator, which consists in generating a stable oscillatory voltage of a reference frequency, mixing a portion of the output of said oscillator with said reference voltage to produce therefrom an oscillatory difference frequency resultant voltage, applying said resultant voltage to said oscillator as a modulating voltage to frequency-modulate said oscillator, whereby wave form distortion of said resultant voltage is produced to provide an unsymmetrical oscillatory voltage, integrating said unsymmetrical voltage to produce therefrom a direct voltage, and applying said direct voltage to said oscillator to shift the rest frequency thereof.

3. In a frequency modulation system, a frequency-modulated oscillator the rest frequency of which is to be stabilized, means for modulating the frequency of said oscillator, a stable reference oscillator, a circuit for mixing the outputs of said oscillators and for producing therefrom an oscillatory resultant voltage having a frequency equal to the difference between the frequencies of said mixed outputs, means for applying said resultant voltage to said first-named means as a modulating voltage to frequency modulate said first-named oscillator, whereby frequency modulation of said resultant voltage is produced to provide an unsymmetrical oscillatory voltage, means for integrating said unsymmetrical voltage to produce therefrom a direct voltage, and means including a portion of said second-named means for applying said direct voltage to said first-named means to shift the rest frequency of said first-named oscillator.

4. In a frequency modulation system, a frequency-modulated oscillator the rest frequency of which is to be stabilized, means for modulating the frequency of said oscillator, a stable reference oscillator, connections including isolating means for applying the outputs of said oscillators to a common mixing circuit, said isolating means serving to prevent direct cross-feed between said two oscillators, said mixing circuit producing from said applied outputs an oscillatory resultant voltage having a frequency equal to the difference between the frequencies of said applied outputs, means for applying said resultant voltage to said first-named means as a modulating voltage to frequency-modulate said first-named oscillator, whereby frequency modulation of said resultant voltage is produced to provide an unsymmetrical oscillatory voltage, means for integrating said unsymmetrical voltage to produce therefrom a direct voltage, and means including a portion of said third-named means for applying said direct-voltage to said first-named means to shift the rest frequency of said first-named oscillator.

5. In a frequency modulation system, a frequency-modulated oscillator the rest frequency of which is to be stabilized, means for modulating the frequency of said oscillator, a stable reference oscillator, a balanced detector circuit including a pair of rectifiers, means connecting the output of one of said oscillators cophasally to said rectifiers, means connecting the output of the other of said oscillators anti-phasally to said rectifiers, whereby the outputs of said oscillators are mixed in said circuit to produce in the output thereof an oscillatory resultant beat frequency voltage, and a circuit including a series capacitance connected to the output of said detector circuit for applying said beat frequency voltage to said first-named means to vary in accordance therewith the rest frequency of said first-named.

6. In a frequency modulation system, a frequency-modulated oscillator the rest frequency of which is to be stabilized, means for modulating the frequency of said oscillator, a stable reference oscillator, a balanced detector circuit including a pair of rectifiers, means connecting the output of one of said oscillators cophasally to said rectifiers, means connecting the output of the other of said oscillators antiphasally to said rectifiers, whereby the outputs of said oscillators are mixed in said circuit to produce in the output thereof an oscillatory resultant beat frequency voltage, and a capacitive voltage-divider connected to the output of said detector circuit for applying a portion of said beat frequency voltage to said first-named means to vary in accordance therewith the rest frequency of said first-named oscillator.

7. In a frequency modulation system, a frequency-modulated oscillator the rest frequency of which is to be stabilized, means for modulating the frequency of said oscillator, a stable reference oscillator, a balanced detector circuit including a pair of rectifiers, means connecting the output of one of said oscillators, through an isolating means, cophasally to said rectifiers, means connecting the output of the other of said oscillators, through an isolating means, antiphasally to said rectifiers, whereby the outputs of said oscillators are mixed in said circuit to produce in the output thereof an oscillatory resultant beat frequency voltage, and means for applying said oscillatory beat frequency voltage to said first-named means to vary in accordance therewith the rest frequency of said first-named oscillator.

8. In a frequency modulation system, a frequency-modulated oscillator the rest frequency of which is to be stabilized, means for modulating the frequency of said oscillator, means for dividing in frequency the output of said oscillator, a stable reference oscillator. means for dividing in frequency the output of said reference oscillator, a circuit for mixing the frequency-divided outputs of said oscillators and for producing therefrom an oscillatory resultant voltage having a frequency equal to the difference between the frequencies of said mixed outputs, and means for applying said resultant voltage to said first-named means to vary in accordance therewith the rest frequency of said first-named oscillator.

9. In a frequency modulation system, a frequency-modulated oscillator the rest frequency of which is to be stabilized, means for modulating the frequency of said oscillator, means for dividing in frequency the output of said oscillator, a stable reference oscillator, means for dividing in frequency the output of said reference oscillator, a balanced detector circuit including a pair of rectifiers, means connecting the frequency-divided output of one of said oscillators cophasally to said rectifiers, means connecting the frequency-divided output of the other of said oscillators antiphasally to said rectifiers, whereby the divided outputs of said oscillators are mixed in said circuit to produce in the output thereof an oscillatory resultant beat frequency voltage, and a circuit including a series capacitance connected to the output of said detector circuit for applying said beat frequency voltage to said first-named means to vary in accordance therewith the rest frequency of said first-named oscillator.

10. In a frequency modulation system, a frequency-modulated oscillator the rest frequency of which is to be stabilized, means for modulating the frequency of said oscillator, means for dividing in frequency the output of said oscillator, a stable reference oscillator, means for dividing in frequency the output of said reference oscillator, a balanced detector circuit including a pair of rectifiers, means connecting the frequency-divided output of one of said oscillators cophasally to said rectifiers, means connecting the frequency-divided output of the other of said oscillators antiphasally to said rectifiers, whereby the divided outputs of said oscillators are mixed in said circuit to produce in the output thereof an oscillatory resultant beat frequency voltage, filtering means connected to the output of said detector circuit for eliminating therefrom the divided outputs of said oscillators, and a circuit including a series capacitance connected through said filtering means to the output of said detector circuit for applying said beat frequency voltage to said first-named means to vary in accordance therewith the rest frequency of said first-named oscillator.

11. In a frequency modulation system, a frequency-modulated oscillator the rest frequency of which is to be stabilized, means for modulating the frequency of said oscillator, a stable reference oscillator, a balanced detector circuit including a pair of rectifiers, means connecting the output of one of said oscillators cophasally to said rectifiers, means connecting the output of the other of said oscillators antiphasally to said rectifiers, whereby the outputs of said oscillators are mixed in said circuit to produce in the output thereof an oscillatory resultant beat frequency voltage, and a series circuit comprising a parallelly-connected resistance and capacitance connected to the output of said detector circuit for applying said beat frequency voltage to said first-named means to vary in accordance therewith the rest frequency of said first-named oscillator.

12. In a frequency modulation system, a frequency-modulated oscillator the rest frequency of which is to be stabilized, means for modulating the frequency of said oscillator, a stable reference oscillator, a balanced detector circuit including a pair of rectifiers, means connecting the output of one of said oscillators cophasally to said rectifiers, means connecting the output of the other of said oscillators anti-phasally to said rectifiers, whereby the outputs of said oscillators are mixed in said circuit to produce in the output thereof an oscillatory resultant beat frequency voltage, a capacitive voltage-divider connected to the output of said detector circuit for applying a portion of said beat frequency voltage to said first-named means to vary in accordance therewith the rest frequency of said first-named oscillator, said divider having a portion thereof in series with the output of said detector circuit, and a resistor connected across the series portion of said divider.

13. In a frequency modulation system, a frequency-modulated oscillator the rest frequency of which is to be stabilized, means for modulating the frequency of said oscillator, means for dividing in frequency the output of said oscillator, a stable reference oscillator, means for dividing in frequency the output of said reference oscillator, a balanced detector circuit including a pair of rectifiers, means connecting the frequency-divided output of one of said oscillators cophasally to said rectifiers, means connecting the frequency-divided output of the other of said oscillators antiphasally to said rectifiers, whereby the divided outputs of said oscillators are mixed in said circuit to produce in the output thereof an oscillatory resultant beat frequency voltage, filtering means connected to the output of said detector circuit for eliminating therefrom the divided outputs of said oscillators, and a series circuit comprising a parallelly-connected resistance and capacitance connected through said filtering means to the output of said detector circuit for applying said beat frequency voltage to said first-named means to vary in accordance therewith the rest frequency of said first-named oscillator.

14. In a frequency modulation system, a frequency-modulated oscillator the rest frequency of which is to be stabilized, means for modulating the frequency of said oscillator, a stable reference oscillator, a balanced detector circuit including a pair of rectifiers, means connecting the output of one of said oscillators, through an isolating means, cophasally to said rectifiers, means connecting the output of the other of said oscillators, through an isolating means, antiphasally to said rectifiers, whereby the outputs of said oscillators are mixed in said circuit to produce in the output thereof an oscillatory resultant beat frequency voltage, and a circuit including a series capacitance connected to the output of said detector circuit for applying said beat frequency voltage to said first-named means to vary in accordance therewith the rest frequency of said first-named oscillator.

15. In a frequency modulation system, a frequency-modulated oscillator the rest frequency of which is to be stabilized, means for modulating the frequency of said oscillator, means for dividing in frequency the output of said oscillator, a stable reference oscillator, means for dividing in frequency the output of said reference oscillator, a balanced detector circuit including a pair of rectifiers, means connecting the frequency-divided output of one of said oscillators, through an isolating means, cophasally to said rectifiers, means connecting the frequency-divided output of the other of said oscillators, through an isolating means, antiphasally to said rectifiers, whereby the divided outputs of said oscillators are mixed in said circuit to produce in the output thereof an oscillatory resultant beat frequency voltage, and a series circuit comprising a parallelly-connected resistance and capacitance connected to the output of said detector circuit for applying said beat frequency voltage to said first-named means to vary in accordance therewith the rest frequency of said first-named oscillator.

16. In a frequency modulation system, a frequency-modulated oscillator the rest frequency of which is to be stabilized, means for modulating the frequency of said oscillator, means for dividing in frequency the output of said oscillator, a stable reference oscillator, means for dividing in frequency the output of said reference oscillator, a balanced detector circuit including a pair of rectifiers, means connecting the frequency-divided output of one of said oscillators, through an isolating means, cophasally to said rectifiers, means connecting the frequency-divided output of the other of said oscillators, through an isolating means, antiphasally to said rectifiers, whereby the divided outputs of said oscillators are mixed in said circuit to produce in the output thereof an oscillatory resultant beat frequency voltage, filtering means connected to the output of said detector circuit for eliminating therefrom the divided outputs of said oscillators, a capacitive voltage-divider connected through said filtering means to the output of said detector circuit for applying a portion of said beat frequency voltage to said first-named means to vary in accordance therewith the rest frequency of said first-named oscillator, said divider having a portion thereof in series with the output of said detector circuit, and a resistor connected across the series portion of said divider.

JOSEPH G. BEARD.
NILS J. OMAN.

REFERENCES CITED

The following references are of record in the file of this patent:

UNITED STATES PATENTS

| Number | Name | Date |
|---|---|---|
| 2,279,659 | Crosby | Apr. 14, 1942 |
| 2,304,134 | Wirkler | Dec. 8, 1942 |
| 2,419,527 | Bartelink | Apr. 29, 1947 |
| 2,456,763 | Ziegler | Dec. 21, 1948 |